(12) United States Patent
Kong et al.

(10) Patent No.: US 11,626,798 B2
(45) Date of Patent: Apr. 11, 2023

(54) DC-DC CONVERTER FOR SOLAR LINKED ENERGY STORAGE SYSTEM AND CONTROL METHOD THEREOF

(71) Applicant: LG INNOTEK CO., LTD., Seoul (KR)

(72) Inventors: Sung Jae Kong, Seoul (KR); Ju Young Jang, Seoul (KR); Jeong Heum Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/275,350

(22) PCT Filed: Jul. 12, 2019

(86) PCT No.: PCT/KR2019/008665
§ 371 (c)(1),
(2) Date: Mar. 11, 2021

(87) PCT Pub. No.: WO2020/054959
PCT Pub. Date: Mar. 19, 2020

(65) Prior Publication Data
US 2022/0052600 A1 Feb. 17, 2022

(30) Foreign Application Priority Data

Sep. 14, 2018 (KR) .................. 10-2018-0110391

(51) Int. Cl.
*H02M 1/14* (2006.01)
*H02M 7/5387* (2007.01)
(Continued)

(52) U.S. Cl.
CPC ............. *H02M 3/158* (2013.01); *H02J 3/381* (2013.01); *H02J 7/35* (2013.01); *H02M 1/14* (2013.01);
(Continued)

(58) Field of Classification Search
CPC .... H02M 1/14; H02M 3/158; H02M 7/53871; H02J 3/381; H02J 7/35; H02J 2300/24; H02S 40/38
See application file for complete search history.

(56) References Cited

U.S. PATENT DOCUMENTS

2002/0118559 A1   8/2002  Kurokami et al.
2010/0198421 A1*  8/2010  Fahimi ...................... H02J 3/32
                                                  700/291
(Continued)

FOREIGN PATENT DOCUMENTS

JP    2013-198365 A    9/2013
KR    10-0466212 B1    1/2005
(Continued)

OTHER PUBLICATIONS

Output Current Ripple Reduction Algorithms for Home Energy Storage Systems, Jin-Hyuk Park, Hae-Gwang Jeong and Kyo-Beum Lee; Oct. 22, 2013; pp. 5552-5569. (Year: 2013).*

*Primary Examiner* — Toan T Vu
(74) *Attorney, Agent, or Firm* — Birch, Stewart, Kolasch & Birch, LLP (57) ABSTRACT

According to an embodiment, disclosed are a DC-DC converter for compensating for a ripple, in a solar linked energy storage system, and a control method thereof. In particular, disclosed is a DC-DC converter for compensating for a ripple generated in a DC link where a single phase inverter and a converter are connected. The DC-DC converter may obtain a frequency of a grid to compensate for the ripple.

20 Claims, 6 Drawing Sheets

(51) Int. Cl.
*H02M 3/158* (2006.01)
*H02J 3/38* (2006.01)
*H02J 7/35* (2006.01)
*H02S 40/38* (2014.01)

(52) U.S. Cl.
CPC ......... *H02M 7/53871* (2013.01); *H02S 40/38* (2014.12); *H02J 2300/24* (2020.01)

(56) References Cited

U.S. PATENT DOCUMENTS

| | | | |
|---|---|---|---|
| 2010/0220501 A1 | 9/2010 | Krause | |
| 2014/0085944 A1 | 3/2014 | Lee et al. | |
| 2017/0192445 A1* | 7/2017 | Dennis | ................... G05F 1/67 |
| 2018/0029486 A1* | 2/2018 | Pfeilschifter | ........... B60L 55/00 |
| 2018/0123508 A1* | 5/2018 | Inoue | ................. H02J 7/345 |

FOREIGN PATENT DOCUMENTS

| | | |
|---|---|---|
| KR | 10-2014-0040985 A | 4/2014 |
| KR | 10-2015-0071508 A | 6/2015 |
| KR | 20150071508 * | 6/2015 |

\* cited by examiner

DC-DC CONVERTER FOR SOLAR LINKED ENERGY STORAGE SYSTEM AND CONTROL METHOD THEREOF

CROSS REFERENCE TO RELATED APPLICATIONS

This application is the National Phase of PCT International Application No. PCT/KR2019/008665, filed on Jul. 12, 2019, which claims priority under 35 U.S.C. 119(a) to Patent Application No. 10-2018-0110391, filed in the Republic of Korea on Sep. 14, 2018, all of which are hereby expressly incorporated by reference into the present application.

TECHNICAL FIELD

In the present disclosure, a DC-DC converter compensating for ripple in a solar-linked energy storage system and a control method thereof are disclosed.

BACKGROUND ART

Recently, as awareness of environmental protection has been increased, interest in a method of generating electricity without discharging pollutants such as carbon dioxide has been emerged. In particular, in the case of a power generation system using solar light, the development and installation cost of the technology becomes cheaper powered by the technological advancement, and the supply is gradually expanding.

In such a solar power generation system, a plurality of solar cells is assembled to form a plurality of photovoltaic modules. The DC power generated from the plurality of photovoltaic modules is converted to AC power through an inverter, and thus, it can be immediately used in industrial facilities.

Meanwhile, in the case of solar power generation, a gap in power generation, during which sufficient power generation is not achieved due to night time when solar light is unavailable or changes in weather, occurs inevitably. Therefore, in order to compensate for such disadvantages, a solar power generation system is essentially equipped with a battery to enable stable power supply.

However, when a single-phase inverter is connected to the grid, there is a problem that ripple may occur in the DC link.

SUMMARY

The present disclosure discloses a DC-DC converter for compensating for a DC link ripple and a method for controlling the same in a solar-linked energy storage system. Specifically, a DC-DC converter compensating for ripple generated when connected to a grid and a control method thereof are disclosed. Of course, the technical problem to be solved is not limited to the technical problems as described above, and various technical problems may be further included within a scope that is obvious to a person skilled in the art.

The DC-DC converter according to a first aspect comprises: a DC link to which solar power is applied; a converting circuit including a plurality of switches; and a processor controlling the converting circuit, wherein the processor obtains a first signal and a second signal by performing phase conversion on a current signal received from the outside, obtains a frequency of the ripple included in the current signal using the first signal and the second signal, and generates a control signal using the obtained ripple frequency to apply it to the converting circuit, and wherein the converting circuit may compensate for the ripple using the control signal.

In addition, a single-phase inverter for supplying power to a grid is connected to the DC link, and the ripple may be generated by the grid.

In addition, the processor may compensate for the ripple by performing synchronous conversion and synchronous inverse conversion using a frequency corresponding to twice the frequency of the grid.

In addition, the control signal may include a pulse width modulation (PWM) signal.

In addition, the converting circuit may include a first field effect transistor (FET) and a second FET connected in series.

In addition, the converting circuit may convert power received from the solar power supply and supply the converted power to the battery.

In addition, the first signal and the second signal may be obtained by performing a phase conversion on a ripple included in a current signal received from the battery, and the phase difference between the first signal and the second signal may be 90 degrees.

In addition, the processor performs band pass filtering on the current signal being received from the outside for a preset frequency range, and may obtain the first signal and the second signal from the signal that has been filtered.

In addition, the grid may be a single-phase grid being used to deliver single phase AC power.

The DC-DC converter according to a second aspect comprises: a DC link to which solar power is applied; a converting circuit including a plurality of switches; and a processor controlling the converting circuit, wherein the processor receives the frequency of a ripple included in the current signal received from a battery connected to the converting circuit, generates a control signal performs synchronous conversion and inverse synchronous conversion using the frequency of the ripple that has been received, and applies the control signal a PWM signal to the converting circuit, and wherein the converting circuit may compensate for the ripple using the control signal.

A method for controlling a DC-DC converter according to a third aspect comprises the steps of: receiving a current signal from the outside; performing phase conversion on the current signal to obtain a first signal and a second signal having a phase difference of 90 degrees from each other; determining the frequency of a ripple included in the current signal by using the first signal and the second signal; obtaining a control signal for compensating for the ripple by using the frequency of the ripple; and compensating for the ripple by applying the control signal to a converting circuit including a plurality of switches.

In addition, the current signal may be received from a battery that is charged using power received from a DC link to which solar power is applied.

In addition, in the step of obtaining the control signal, the control signal may be obtained by performing synchronous conversion and inverse synchronous conversion using the frequency of the ripple.

A fourth aspect can provide a computer-readable recording medium storing a program for executing the method of the third aspect on a computer.

Advantageous Effects

The present disclosure discloses a DC-DC converter for compensating for the ripple and a method for controlling the same in a solar linked energy storage system.

DETAILED DESCRIPTION OF THE EMBODIMENTS

Hereinafter, embodiments of the present invention will be described in detail with reference to the accompanying drawings. However, the technical idea of the present invention is not limited to some embodiments to be described, but may be implemented in various forms, and if it is within the scope of the technical idea of the present invention, one or more of the components may be selected, combined, and substituted between the embodiments for use. In addition, terms (including technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology. In addition, terms used in the embodiments of the present invention are for describing the embodiments and are not intended to limit the present invention. In the present specification, the singular form may include the plural form unless specifically stated in the phrase, and when described as "at least one (or more than one) of A and B and C", it may contain one or more of all combinations that can be combined with A, B, and C. In addition, terms such as first, second, A, B, (a), (b), and the like may be used in describing the components of the embodiment of the present invention. These terms are only for distinguishing the component from other components, and are not limited to the nature, order, or order of the component by the term. And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components. In addition, when it is described as being formed or disposed in the "top (upper side) or bottom (lower side)" of each component, the top (upper side) or bottom (lower side) not only includes a case when the two components are in direct contact with each other but also includes a case where one or more other components are formed or disposed between the two components. In addition, when expressed as "top (upper side) or bottom (lower side)", the meaning of not only an upward direction but also a downward direction based on one component may be included.

Hereinafter, embodiments of the present invention will be described in detail with reference to the drawings.

Figure 1:
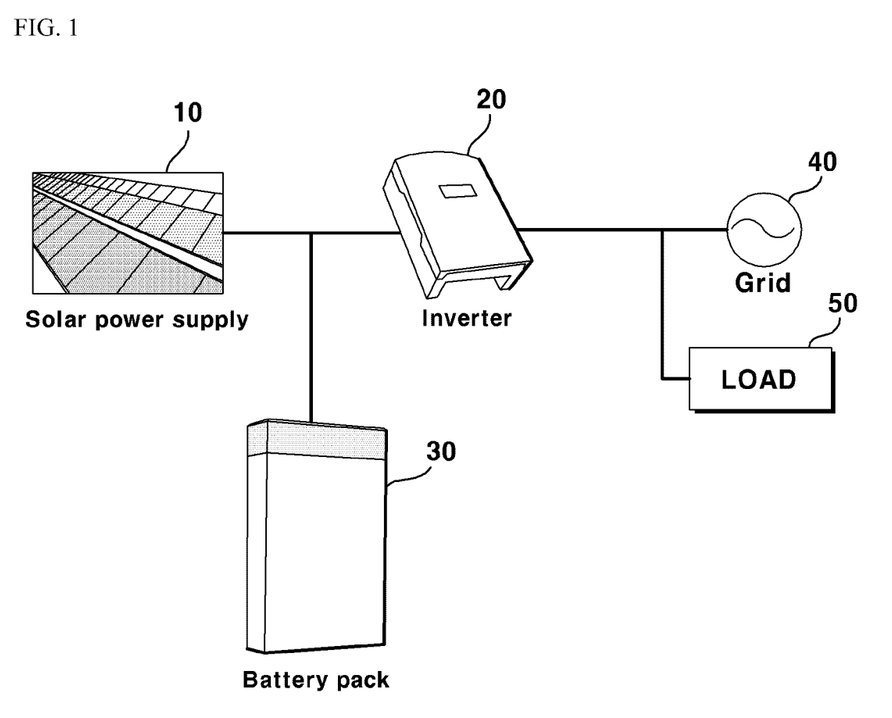
FIG. 1 is a diagram illustrating a solar power generation system according to an embodiment. The solar linked energy storage system may be an example of a solar power generation system.

FIG. 1 is a diagram illustrating a solar power generation system according to an embodiment. The solar linked energy storage system may be an example of a solar power generation system.

As illustrated in FIG. 1, a solar power generation system may comprise a solar power supply 10, a single phase inverter 20, a battery pack 30, and a load 50.

However, it can be understood by a person skilled in the art that general-purpose components other than the components illustrated in FIG. 1 may be further included in the solar power generation system. For example, the solar power generation system may further include a grid (GRID) 40. Or, according to another embodiment, it may be understood by a person skilled in the art that some of the components illustrated in FIG. 1 may be omitted.

The solar power supply 10 according to an embodiment may be composed of a plurality of photovoltaic modules in which photovoltaic cells are assembled, and a photovoltaic cell formed by bonding a p-type semiconductor and an n-type semiconductor generates electricity with light. Specifically, when a light is irradiated on a photovoltaic cell, electrons and holes are generated therein. The generated charges are moved to the P and N poles, respectively, and by this action, a potential difference occurs between the P and N poles, and at this time, when a load is connected to the photovoltaic cell a current flows. Here, the photovoltaic cell refers to the smallest unit that generates electricity, and the photovoltaic cells are gathered to form a photovoltaic module, and the photovoltaic module may form an array connected in series/parallel to form a solar power supply 10.

In order to supply a power to the grid 40 or the load 50, the single phase inverter 20 according to an embodiment may convert a direct current (DC) power generated by the solar power supply 10 by the photoelectric effect to an alternating current (AC) power. Here, the grid 40 may refer to a grid for transmitting and distributing power produced by the solar power generation system. Meanwhile, the amount of power generated by the solar power supply 10 is continuously changed by temporal factors such as sunrise and sunset, or external factors such as weather and the like. Therefore, the single phase inverter 20 controls the voltage generated from the solar power supply 10 to find the maximum power and supply it to the grid 40. At this time, when a case occurs in that the power for operating the single phase inverter 20 is lower than the output power of the single phase inverter, the single phase inverter 20 may consume the power of the grid 40 in reverse. Of course, in this case, the single phase inverter 20 may prevent power from being reversed by blocking the power flowing into the grid 40. Accordingly, various optimal control methods for extracting maximum power from the solar power supply 10 are applied to the solar power generation system, so that the above-described operation of the single phase inverter 20 can be performed more efficiently.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10, so that the rate of change of the power with respect to the change of the operating point of the terminal voltage of the array becomes '0'. The CV control method is a method of controlling the solar power supply 10 with a constant reference voltage (refV) regardless of the operating voltage or power of the array. According to each optimal control method, a power source input from the solar power supply 10 to the single phase inverter 20 may operate as a voltage source or a current source.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10, so that the rate of change of the power with respect to the change of the operating point of the terminal voltage of the array becomes '0'. The CV control method is a method of controlling the solar power supply 10 with a constant reference voltage (refV) regardless of the operating voltage or power of the array. According to each optimal control method, a power source input from the solar power supply 10 to the single phase inverter 20 may operate as a voltage source or a current source.

In addition, in the case of solar power generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 30 according to an embodiment may comprise at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar power supply 10 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the set value and cut-off and open the power circuit between cells.

Meanwhile, the single phase inverter 20 and the battery pack 30 may further comprise a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may comprise two or more displays depending on the implementation type. In addition, when the touch pad of the display has a layer structure and is configured as a touch screen, the display may also be used as an input device in addition to an output device.

In addition, the single phase inverter 20 and the battery pack 30 may communicate with each other through wired communication or wireless communication. For example, the single phase inverter 20 and the battery pack 30 may comprise a Wi-Fi chip, a Bluetooth chip, a wireless communication chip, an NFC chip, or the like. Of course, the single phase inverter 20 and the battery pack 30 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, ZigBee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Figure 2:
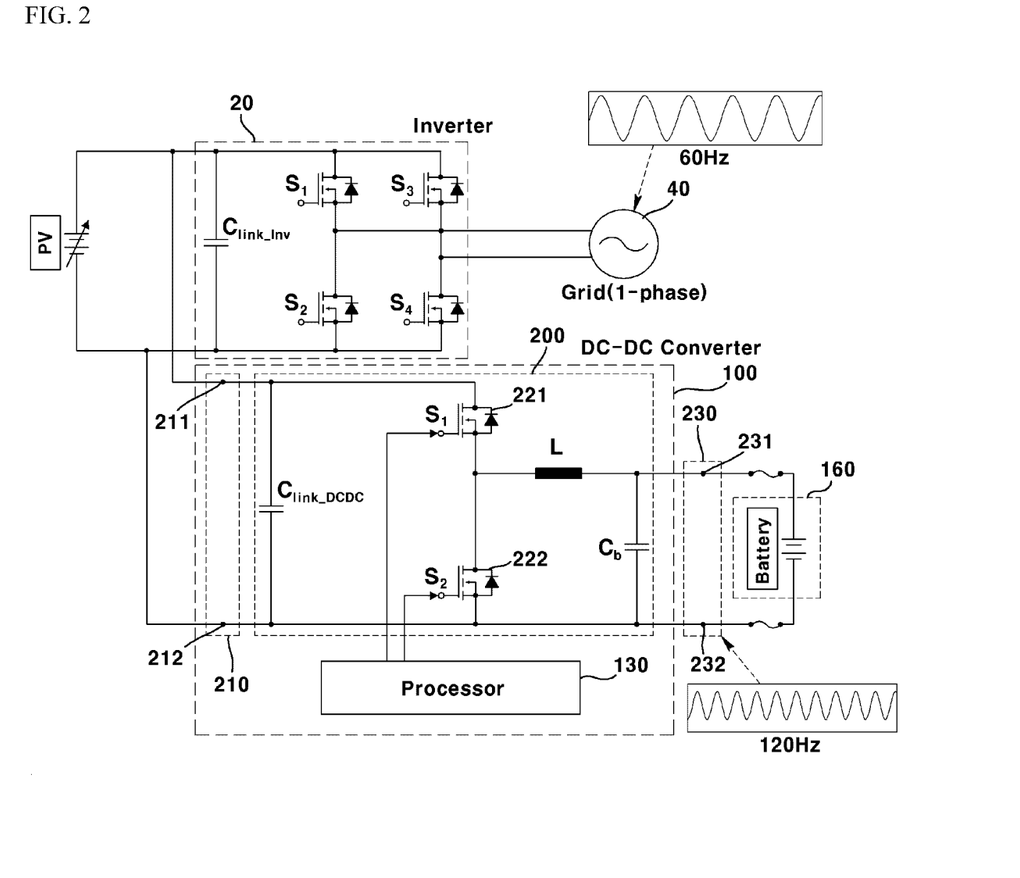
FIG. 2 is a block diagram illustrating an example in which a DC-DC converter is connected to a single phase inverter and operates according to an embodiment.

FIG. 2 is a block diagram illustrating an example in which a DC-DC converter is connected to a single phase inverter and operates according to an embodiment.

As illustrated in FIG. 2, the single-phase inverter 20 and the DC-DC converter 100 may be connected and operated. Referring to FIG. 2, the DC-DC converter 100 may include a DC link 210, a converting circuit 200 and a processor 130. In addition, the DC link 210 may include a first node 211 and a second node 212. In addition, the converting circuit 200 may include a first switch 221 and a second switch 222.

However, a person skilled in the art can understand that other general-purpose components other than the components illustrated in FIG. 2 may be further included in the single phase inverter 20 or the DC-DC converter 100. For example, the DC-DC converter 100 may further include a memory (not shown). Or, according to another embodiment, it may be understood by a person skilled in the art that some of the components illustrated in FIG. 2 may be omitted.

Power may be applied from the solar power supply 10 to the DC link 210. A single-phase inverter 20 that supplies power to the grid 40 is connected to the DC link 210, and a ripple may be generated by the grid 40. Power applied from the solar power supply 10 is DC, but since AC is applied to the grid 40 connected to the single phase inverter 20, ripple may be generated in the DC link 210 by the grid 40.

The converting circuit 200 may convert power received from the solar power supply 10 and supply the converted power to the battery 160. Specifically, the converting circuit 200 may convert a voltage applied to the DC link 210 and apply it to the battery 160. Or, the converting circuit 200 may convert a voltage applied from the battery 160 and apply it to the DC link 210. For example, the DC-DC converter 100 may charge the battery 160 by using the power generated by the solar power supply 10 when sufficient power is generated from the solar power supply 10. As another example, when the DC-DC converter 100 does not generate sufficient power from the solar power supply 10 and the remaining amount of the battery 160 is sufficient, power can be supplied to the single phase inverter 20 by using the power of the battery 160.

The converting circuit 200 according to an embodiment may convert power received from the solar power supply 10. For example, the converting circuit 200 may convert a voltage of power applied from the solar power supply 10. Specifically, the converting circuit 200 may convert a voltage using a plurality of switches 221 and 222 included in the converting circuit 200. The plurality of switches 221 and 222 may operate according to a control signal received from the processor 130.

The converting circuit 200 may include a capacitor, an inductor, a resistor, a switch, and the like, and may be configured as a half bridge or a full bridge.

The processor 130 may compensate for a ripple of the DC link voltage applied to the DC link 210 by using the power of the battery 160 connected to the converting circuit 200. For example, the processor 130 may compensate a ripple of the DC link voltage applied to the DC link 210 by controlling a plurality of switches 221 and 222 included in the converting circuit 200. Specifically, the processor 130 obtains an active power component of the DC link voltage, and the ripple may be compensated by applying a control signal, which is obtained by using an active power component, to the converting circuit 200.

The processor 130 separates the DC link voltage into a first signal (e.g., an alpha signal) and a second signal (e.g., a beta signal), and may obtain an active power component through synchronous conversion of the first signal and the second signal. Here, the first signal and the second signal may have a phase difference of 90 degrees.

The processor 130 may perform filtering on a DC link voltage and phase conversion, and separate an alpha signal and a beta signal. In addition, the processor 130 obtains an active power component through synchronous conversion of the separated alpha signal and beta signal, and may perform proportional integral control by merging a compensation command for an active power component.

The processor 130 obtains a control signal by performing proportional integral control on the active power component obtained from the DC link voltage, and applies the control signal to the converting circuit 200 to compensate a ripple.

The processor 130 may obtain a frequency component of a size corresponding to two times of the frequency being used in the grid 40 from the DC link voltage, and obtain an active power component from the obtained frequency component. In addition, the processor 130 may perform band pass filtering when obtaining a specific frequency component. Signal conversion, such as band pass filtering, may be performed digitally. For example, band pass filtering may be performed through a digital filter.

The processor 130 may obtain a control signal through synchronous conversion and inverse synchronous conversion. Specifically, the processor 130 may extract an active power component by performing synchronous conversion on the separated alpha signal and beta signal. In addition, the processor 130 may obtain a control signal by performing inverse synchronous conversion on the signal on which the proportional integral control has been performed.

The control signal may include a pulse width modulation (PWM) signal. Specifically, the control signal may include a signal applied to the plurality of switches 221 and 222, and the control signal applied to the plurality of switches 221 and 222 may be in the form of a square wave or a pulse wave.

The converting circuit 200 may include a first field effect transistor (FET) 221 and a second FET 222 connected in series. The first FET 221 and the second FET 222 may be connected in series, and the converting circuit 200 may be configured as a half bridge, as illustrated in FIG. 2.

The grid 40 may be single phase. The grid 40 may be used to deliver single-phase AC power. For example, the load connected to the grid 40 may be a product using single phase AC.

A frequency corresponding to twice the frequency used in the grid 40 may be obtained from the current signal outputted from the battery 160. Referring to FIG. 2, when the frequency used in the grid 40 is 60 Hz, a frequency of 120 Hz may be obtained from a current signal outputted from the battery 160. The current outputted from the battery 160 may be basically direct current. Therefore, when the frequency obtained from the current signal outputted from the battery 160 is 120 Hz, it may mean that the frequency of the ripple seen in the current outputted from the battery 160 is 120 Hz.

When sufficient power is received from solar light, the battery 160 may be charged using the power received from the DC link 210. Or, when power is not received from solar light, the battery 160 may supply power to the grid 40 through the DC link 210.

The processor 130 obtains a first signal and a second signal by performing a phase conversion on a current signal received from the outside (e.g., a battery 160), and obtains (e.g., determines) the frequency of the ripple included in the current signal by using the first signal and the second signal, generates a control signal using the ripple frequency obtained, and may apply to the converting circuit 200.

The first signal and the second signal may be obtained by performing phase conversion on the ripple included in the current signal received from the battery 160. The first signal may be referred to as an alpha signal and the second signal may be referred to as a beta signal, and a phase difference between the first signal and the second signal may be a preset value. For example, the phase difference between the first signal and the second signal may be 90 degrees.

The processor 130 may perform a band pass filtering the current signal received from the outside (e.g., a battery 160) for a preset frequency range, and may obtain the first signal and the second signal from the filtered signal. A first signal and a second signal may be obtained for a ripple component included in the current signal.

The converting circuit 200 may compensate for a ripple outputted from the battery 160 or a ripple applied to the DC link 210 by using a control signal obtained by using a frequency determined according to the first signal and the second signal.

According to one embodiment, ripple may be caused by a grid 40. The grid 40 according to an embodiment may be a single phase grid used to transmit single phase AC power. Since AC is used in the grid 40, ripple may occur in the DC link 210 or a battery output terminal 230 where direct current is used. The frequency of the ripple generated in the DC link 210 or the battery output terminal 230 may be twice the frequency used in the grid 40. For example, as illustrated in FIG. 2, when the frequency used in the grid 40 is 60 Hz, the frequency of the ripple generated at the battery output terminal 230 may be 120 Hz. The ripple generated at the battery output terminal 230 and the ripple generated at the DC link 210 may be substantially similar. Accordingly, the frequency of the ripple generated in the battery output terminal 230 and the ripple generated in the DC link 210 may correspond to twice the frequency used in the grid 40.

Referring to FIG. 2, the converting circuit 200 and the single phase inverter 20 may be connected through a DC link 210. In addition, the single phase inverter 20 may supply power to the grid 40. The single phase inverter 40 may receive power from a solar power supply and apply it to the grid 40, or may receive power from the converting circuit 200 and apply it to the grid 40. The converting circuit 200 may convert power received from the solar power supply and supply it to the battery 160, or convert the power received from the battery 160 and supply it to the single phase inverter 20.

The processor 130 according to an embodiment may compensate for ripple by performing synchronous conversion and inverse synchronous conversion using the frequency of the ripple. The processor 130 obtains a control signal by performing synchronization conversion and inverse synchronization conversion using the frequency of the ripple, and applies the obtained control signal to the converting circuit 200, so that the ripple at the battery output terminal 230 or at the DC link 210 can be compensated.

The control signal may include a pulse width modulation (PWM) signal. For example, the processor 130 may compensate for ripple by applying an appropriate PWM signal to the first FET 221 and the second FET 222.

The processor 130 may receive the frequency of a ripple and compensate for the ripple using the frequency of the ripple that has been received. Specifically, the processor 130 receives the frequency of the ripple included in the current signal received from the battery 160 connected to the conversion circuit 200, generates a control signal by performing synchronous conversion and inverse synchronous conversion using the frequency of the ripple that has been received, applies the control signal including a PWM signal is applied to the converting circuit 200, and the converting circuit 200 may compensate for the ripple using a control signal.

Synchronous conversion may mean a type of conversion method in which frequency components excluded in control and controlling only by size, and inverse synchronous conversion may mean conversion in the opposite direction of synchronous conversion.

Figure 3:
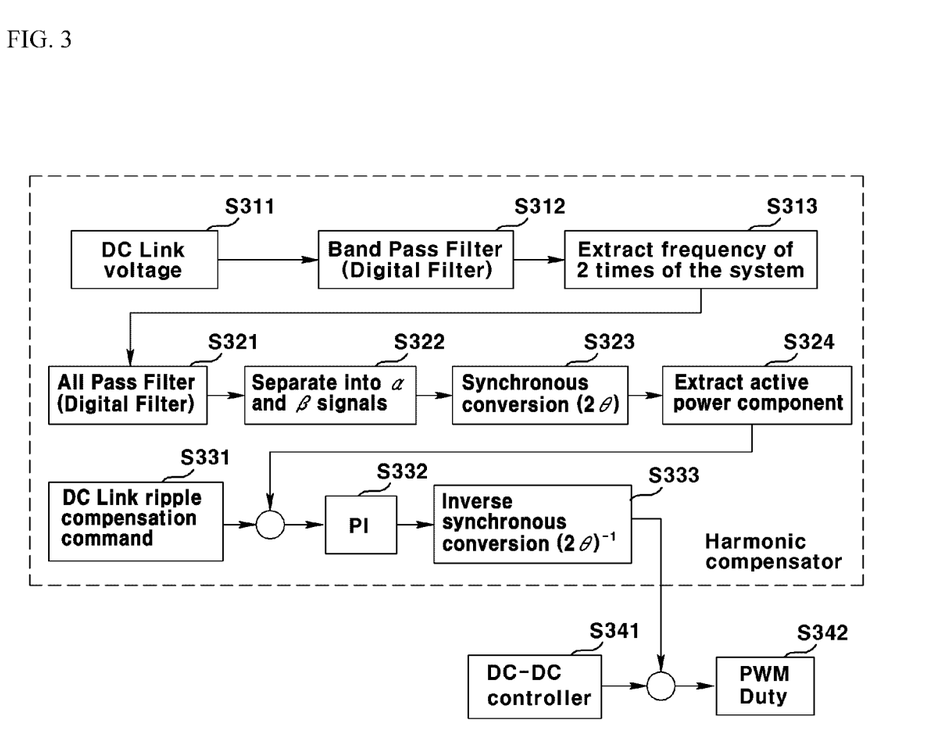
FIG. 3 is a flowchart specifically illustrating a method of obtaining a control signal by a DC-DC converter according to an embodiment.

FIG. 3 is a flowchart specifically illustrating a method of obtaining a control signal by a DC-DC converter according to an embodiment.

In step S311, the DC-DC converter 100 according to an embodiment acquires a DC link voltage, and in step S312, the DC-DC converter 100 according to an embodiment may perform a band pass filtering on the DC link voltage obtained in step S311.

In step S313, the DC-DC converter 100 according to an embodiment acquires a frequency component having a size corresponding to twice the frequency used in the grid 40, and in step S321, the DC-DC converter 100 according to an embodiment may perform a phase conversion on the frequency component that has been obtained.

In step S322, the DC-DC converter 100 according to an embodiment separates the phase converted signal into a first signal and a second signal. The first signal and the second signal may have a phase difference by a predetermined amount (e.g., 90 degrees).

In step S323, the DC-DC converter 100 according to an embodiment performs synchronous conversion on the separated first and second signals, and in step S324, the DC-DC converter 100 according to an embodiment may extract an active power component.

In step S331, the DC-DC converter 100 according to an embodiment outputs a command for compensating for a DC link ripple, and in step S332, the DC-DC converter 100 according to an embodiment performs a proportional integral control using the command outputted in step S331 and the active power component extracted in step S324.

In step S333, the DC-DC converter 100 according to an embodiment performs inverse synchronous conversion on the result of performing the proportional integral control, and in step S341, the DC-DC converter 100 according to an embodiment acquires a signal to control the DC-DC converter 100, and in step S342, the DC-DC converter 100 according to an embodiment may generate a control signal for controlling the first switch 221 and the second switch 222 by using the signal acquired in step S333 and the signal acquired in step S341.

Step S311, step S312, step S313, step S321, step S322, step S323, step S324, step S331, step S332, and step S333 may be performed in a harmonic compensator (not shown), and since the operation of the harmonic compensator according to an example can be performed digitally, the operation in each step illustrated in FIG. 3 may be performed substantially by the processor 130.

Figure 4:
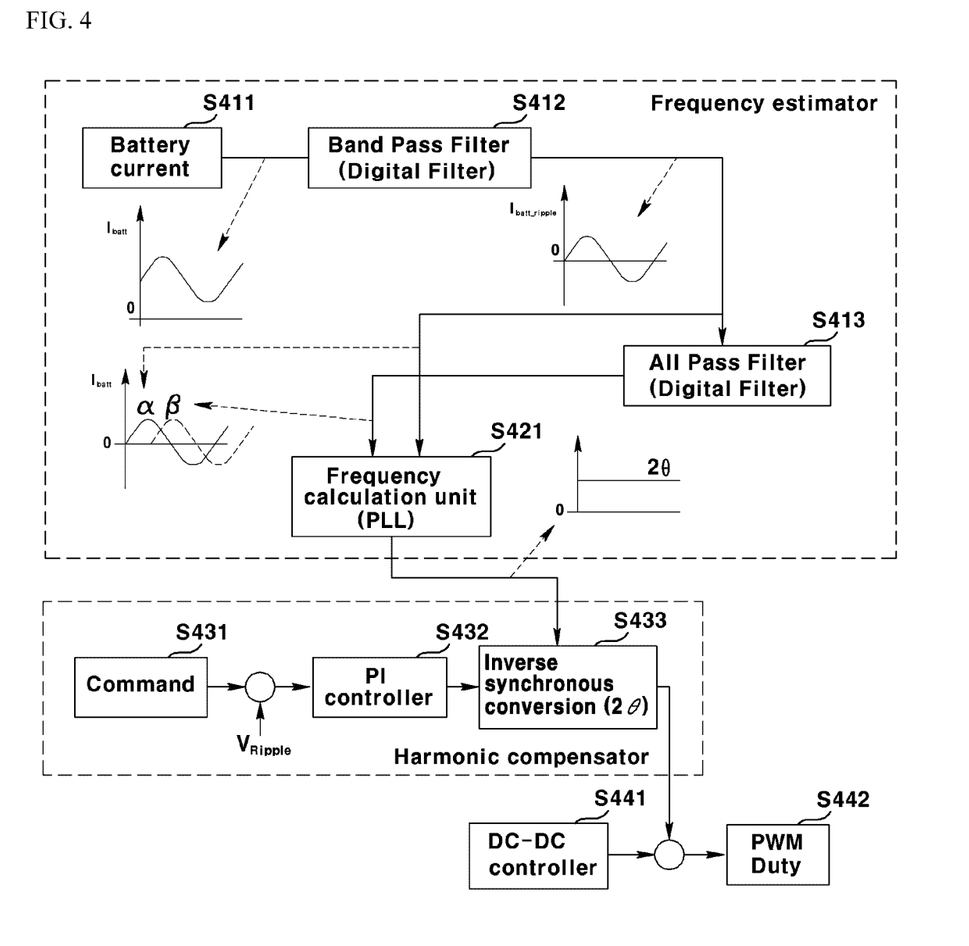
FIG. 4 is a flowchart illustrating an example of a method for compensating ripple by obtaining a grid frequency by a DC-DC converter according to an embodiment.

FIG. 4 is a flowchart illustrating an example of a method for compensating ripple by obtaining a grid frequency by a DC-DC converter 100 according to an embodiment.

FIG. 4 is disclosed by omitting some of the contents described in FIG. 3. Specifically, since the step S411, step S412, step S421, step S422, step S431, step S432, step S433, step S441, and step S442 respectively corresponds to step S311, step S313, step S322, step S324, step S331, step S332, step S333, step S341, and step S342, detailed description will be omitted to simplify the overall description.

In step S413 disclosed in FIG. 4, the DC-DC converter 100 may transmit the frequency extracted in S412 for separating a first signal and a second signal therefrom.

Step S411, step S412, step S413, step S421, step S422, step S431, step S432, and step S433 may be performed in a harmonic compensator (not shown), and since the operation of the harmonic compensator according to an example can be performed digitally, the operations in each step illustrated in FIG. 4 may be performed substantially by the processor 130. For example, the processor 130 may perform synchronization conversion in step S422. Synchronous conversion may mean a type of conversion method for excluding frequency components in control and controlling only by size.

Figure 5:
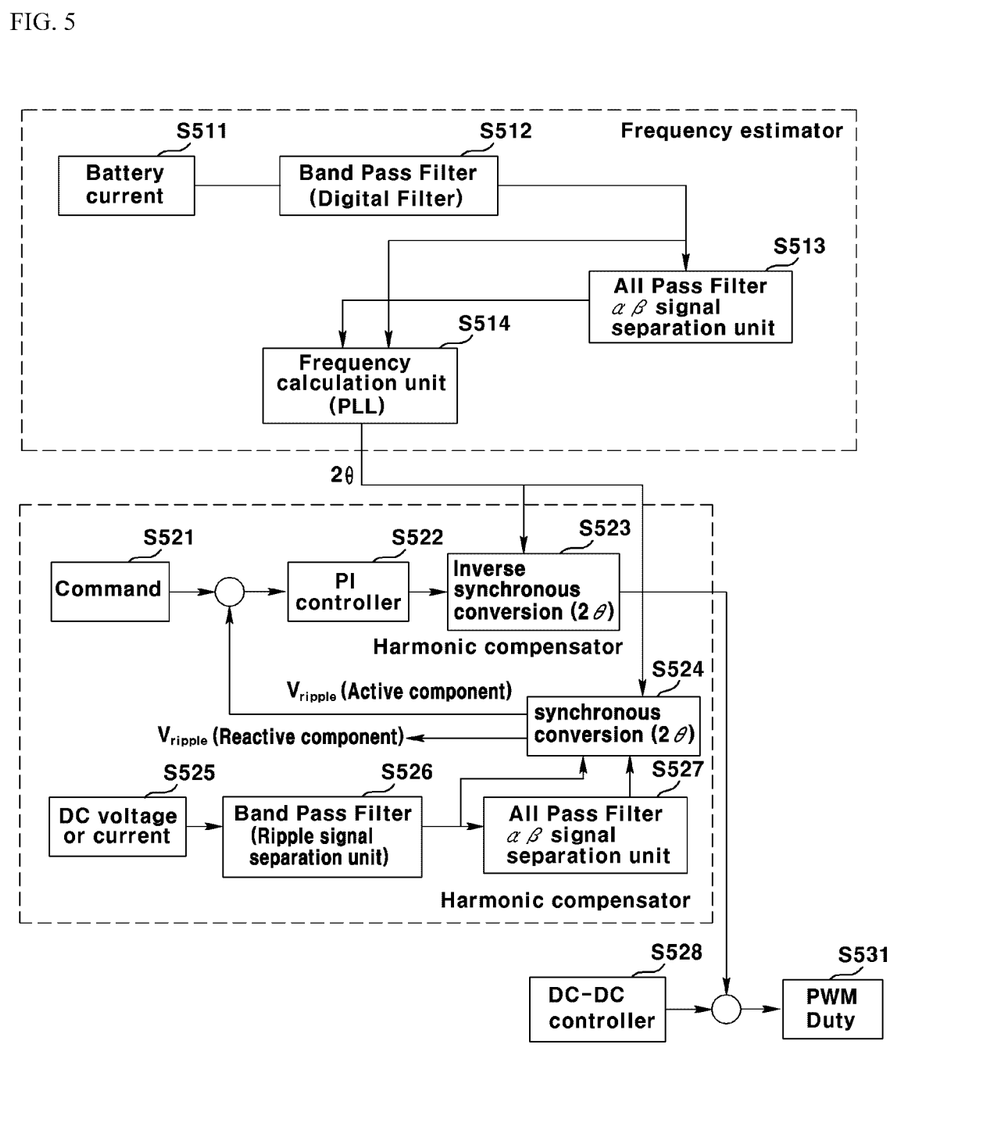
FIG. 5 is a flowchart illustrating an example of a method of compensating for ripple by using an inverse synchronous conversion and a synchronous conversion by obtaining a frequency of a grid by a DC-DC converter according to an embodiment.

FIG. 5 is a flowchart illustrating an example of a method of compensating for ripple by using an inverse synchronous conversion and a synchronous conversion by obtaining a frequency of a grid by a DC-DC converter 100 according to an embodiment.

In steps S511, S512, S513, and S514, the DC-DC converter 100 may determine the frequency of the ripple.

Specifically, the DC-DC converter 100 may obtain the current of the battery 160 in step S511 and separate the ripple from the current of the battery 160 in step S512. In particular, in step S512, the DC-DC converter 100 filters only frequency components within an appropriate range through band pass filtering, thereby obtaining ripple.

In addition, in step S513, the DC-DC converter 100 may separate a first signal (e.g., an alpha signal) and a second signal (e.g., a beta signal) from the ripple obtained in step S512.

In step S513, the DC-DC converter 100 may determine the frequency of the ripple 20 using the ripple, the first signal, and the second signal.

In step S521, step S522, step S523, step S524, step S525, step S526, step S527, step S528, and step S531, the DC-DC converter 100 may compensate for the ripple by obtaining a control signal.

Specifically, in step S521, the DC-DC converter 100 obtains a command and performs PI control in step S522. In step S523, the DC-DC converter 100 performs inverse synchronous conversion using the ripple frequency 20.

In step S524, the DC-DC converter 100 performs synchronous conversion using the ripple frequency 20, and the result of performing the synchronous conversion and the command in step S521 may be used when performing PI control.

In step S525, the DC-DC converter 100 may obtain a DC voltage or current, and after separating the ripple in step S526, the first signal and the second signal may be separated in step S527.

Steps S528 and S531 correspond to the above described steps S341 and S342, detailed descriptions will be omitted to simplify the overall description.

Figure 6:
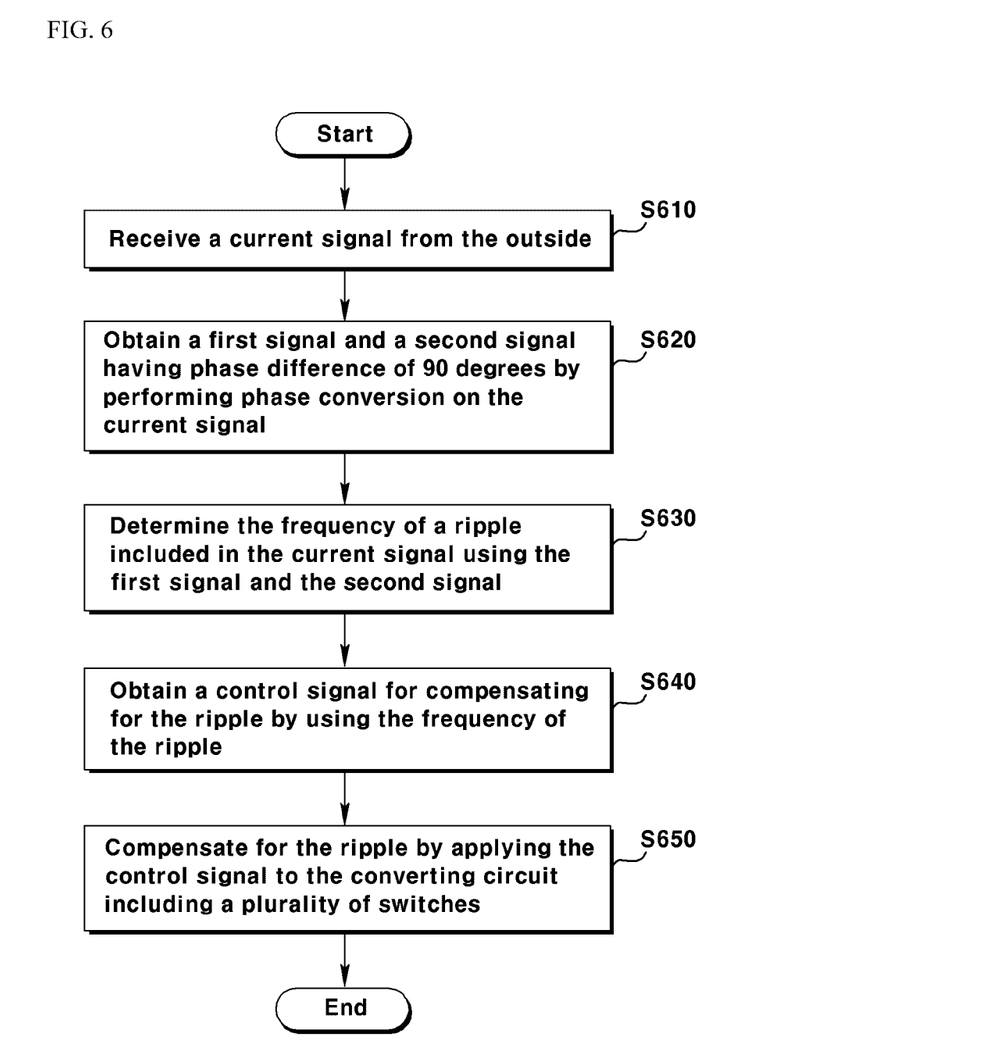
FIG. 6 is a flowchart illustrating a method of controlling a DC-DC converter according to an embodiment.

FIG. 6 is a flowchart illustrating a method of controlling a DC-DC converter 100 according to an embodiment.

In step S610, the DC-DC converter 100 according to an embodiment receives a current signal from the outside. For example, the DC-DC converter 100 may receive a current signal from the battery 160.

In step S620, the DC-DC converter 100 according to an embodiment performs phase conversion on the current signal to obtain a first signal and a second signal having a phase difference of 90 degrees from each other.

The current output from the battery 160 may be basically direct current. Accordingly, the DC-DC converter 100 may obtain the first signal and the second signal by performing phase conversion on the ripple seen in the current outputted from the battery 160. Specifically, the DC-DC converter 100 may obtain the first signal and the second signal through band pass filtering and phase delay. There may be a phase difference of 90 degrees between the first signal and the second signal.

In step S630, the DC-DC converter 100 according to an embodiment determines the frequency of the ripple included in the current signal using the first signal and the second signal. The frequency of the ripple may correspond to twice the frequency used in the grid.

In step S640, the DC-DC converter 100 according to an embodiment acquires a control signal for compensating for the ripple by using the frequency of the ripple.

The control signal may include a PWM signal. Specifically, the control signal may include a signal applied to the plurality of switches 221 and 222, and the control signal applied to the plurality of switches 221 and 222 may be in the form of a square wave or a pulse wave.

In step S650, the DC-DC converter 100 according to an embodiment applies a control signal to a converting circuit including a plurality of switches to compensate for ripple.

Meanwhile, the above-described method can be written as a program that can be executed on a computer, and can be implemented in a general-purpose digital computer operating the program using a computer-readable recording medium. In addition, the structure of the data used in the above method can be recorded on a computer-readable recording medium through various means. The computer-readable recording medium includes storage media such as magnetic storage media (e.g., ROM, RAM, USB, floppy disk, hard disk, etc.), optical reading media (e.g., CD-ROM, DVD, etc.) do.

It will be understood by a person of ordinary skill in the art related to the present embodiment that it may be implemented in a modified form within a scope not departing from the essential characteristics of the above description. Therefore, the disclosed methods should be considered from an explanatory point of view rather than a limiting point of view. The scope of the present invention is illustrated in the claims rather than the foregoing description, and all differences within the scope equivalent thereto should be construed as being included in the present invention.

The invention claimed is:

1. A DC-DC converter comprising:
a DC link having a first node and a second node directly connected to a solar power supply;
a converting circuit including a first transistor and a second transistor connected in series such that a source of the first transistor is connected to a drain of the second transistor; and
a processor for controlling the converting circuit,
wherein the processor obtains a first signal and a second signal by performing phase conversion on a current signal received from a battery, obtains a frequency of a ripple included in the current signal by using the first signal and the second signal, and generates a control signal, by using the frequency of the ripple to apply it to the converting circuit,
wherein the converting circuit compensates for the ripple by using the control signal,
wherein a drain of the first transistor is directly connected to the first node of the DC link and a source of the second transistor is directly connected to the second node of the DC link,
wherein a gate of the first transistor and a gate of the second transistor are connected to the processor,
wherein the processor obtains a first signal and a second signal of the DC link by performing phase conversion on a voltage signal received from the DC link, obtains an active power component of the DC link by performing synchronous conversion on the voltage signal using the frequency of the ripple and the first signal and the second signal of the DC link, and
wherein the processor outputs a command for compensating for a DC link ripple, performs a proportional integral control using the command and the active power component of the DC link, and compensates for the ripple by performing a synchronous inverse conversion on a result of performing the proportional integral control.

2. The DC-DC converter according to claim 1, wherein a single-phase inverter for supplying power to a grid is connected to the DC link, and the ripple is generated by the grid.

3. The DC-DC converter according to claim 2, wherein the processor compensates for the ripple by performing synchronous conversion and synchronous inverse conversion by using a frequency corresponding to twice of a frequency of the grid.

4. The DC-DC converter according to claim 1, wherein the control signal includes a pulse width modulation (PWM) signal.

5. The DC-DC converter according to claim 1, wherein the first and second transistors are field effect transistors (FETs).

6. The DC-DC converter according to claim 1, wherein the converting circuit converts power received from the solar power supply and supplies the converted power to the battery.

7. The DC-DC converter according to claim 6, wherein a phase difference between the first signal and the second signal is 90 degrees.

8. The DC-DC converter according to claim 1, wherein the processor performs band pass filtering on the current signal received from the outside for a preset frequency range, and obtains the first signal and the second signal from a filtered signal.

9. The DC-DC converter according to claim 2, wherein the grid is a single phase grid being used to deliver a single phase AC power.

10. A DC-DC converter comprising:
a DC link having a first node and a second node directly connected to a solar power supply;
a converting circuit including a first transistor and a second transistor connected in series such that a source of the first transistor is connected to a drain of the second transistor; and
a processor for controlling the converting circuit,
wherein the processor receives a frequency of a ripple included in a current signal received from a battery connected to the converting circuit, generates a control signal by performing synchronous conversion and synchronous inverse conversion using the frequency of the ripple, and applies the control signal including a PWM signal to the converting circuit,
wherein the converting circuit compensates for the ripple by using the control signal,
wherein a drain of the first transistor is directly connected to the first node of the DC link and a source of the second transistor is directly connected to the second node of the DC link,
wherein a gate of the first transistor and a gate of the second transistor are connected to the processor,
wherein the processor obtains a first signal and a second signal of the DC link by performing phase conversion on a voltage signal received from the DC link, and obtains an active power component of the DC link by performing synchronous conversion on the voltage signal using the frequency of the ripple and the first signal and the second signal of the DC link, and
wherein the processor outputs a command for compensating for a DC link ripple, performs a proportional integral control using the command and the active power component of the DC link, and compensates for the ripple by performing a synchronous inverse conversion on a result of performing the proportional integral control.

11. The DC-DC converter according to claim 10, wherein the control signal includes a pulse width modulation (PWM) signal.

12. The DC-DC converter according to claim 10, wherein the first and second transistors are field effect transistors (FETs).

13. The DC-DC converter according to claim 10, wherein the converting circuit converts power received from the solar power supply and supplies the converted power to the battery.

14. The DC-DC converter according to claim 10, wherein a phase difference between the first signal and the second signal is 90 degrees.

15. The DC-DC converter according to claim 10, wherein the processor performs band pass filtering on the current signal received from the battery for a preset frequency range, and obtains the first signal and the second signal from a filtered signal.

16. The DC-DC converter according to claim 10, wherein a single-phase inverter for supplying power to a grid is connected to the DC link, and the grid is a single phase grid being used to deliver a single phase AC power.

17. A method for controlling a DC-DC converter, the method comprising:
receiving a current signal from an outside;
performing phase conversion on the current signal to obtain a first signal and a second signal having a phase difference of 90 degrees from each other;
determining a frequency of a ripple included in the current signal by using the first signal and the second signal;
obtaining a control signal for compensating for the ripple by using the frequency of the ripple; and
compensating for the ripple by applying the control signal to a converting circuit included in the DC-DC converter,
wherein DC-DC converter further comprises:
a processor for applying the control signal to the converting circuit; and
a DC link having a first node and a second node directly connected to a solar power supply,
wherein the converting circuit includes a first transistor and a second transistor connected in series such that a source of the first transistor is connected to a drain of the second transistor,
wherein a drain of the first transistor is directly connected to the first node of the DC link and a source of the second transistor is directly connected to the second node of the DC link,
wherein a gate of the first transistor and a gate of the second transistor are connected to the processor, and
wherein the obtaining the control signal comprises:
obtaining a first signal and a second signal of the DC link by performing phase conversion on a voltage signal received from the DC link;
obtaining an active power component of the DC link by performing synchronous conversion on the voltage signal using the frequency of the ripple and the first signal and the second signal of the DC link, and outputting a command for compensating for a DC link ripple;
performing a proportional integral control using the command and the active power component of the DC link; and
obtaining the control signal by performing a synchronous inverse conversion on a result of performing the proportional integral control.

18. The method for controlling the DC-DC converter according to claim 17, wherein the current signal is received from a battery charged by using a power received from the DC link to which solar power from the solar power supply is applied.

19. The method for controlling the DC-DC converter according to claim 17, wherein in the obtaining the control signal, the control signal is obtained by performing synchronous conversion and synchronous inverse conversion by using the frequency of the ripple.

20. The method for controlling the DC-DC converter according to claim 17, wherein the performing phase conversion comprises performing band pass filtering on the current signal received from the outside for a preset frequency range, and obtaining the first signal and the second signal from a filtered signal.

\* \* \* \* \*